United States Patent
Britton et al.

(10) Patent No.: US 7,547,029 B2
(45) Date of Patent: Jun. 16, 2009

(54) CHILD TRANSPORT VEHICLE

(75) Inventors: Daniel William Britton, Calgary (CA); Graham Alexander Lemee, Calgary (CA); Barry Dean Wylant, Calgary (CA); Antony William Stephen Gellion, Calgary (CA)

(73) Assignee: 634182 Alberta Ltd., Calgary (CA)

( * ) Notice: Subject to any disclaimer, the term of this patent is extended or adjusted under 35 U.S.C. 154(b) by 282 days.

(21) Appl. No.: 11/532,037

(22) Filed: Sep. 14, 2006

(65) Prior Publication Data
US 2008/0067787 A1  Mar. 20, 2008

(51) Int. Cl.
*B62K 27/00* (2006.01)
(52) U.S. Cl. ............... 280/204; 280/647; 280/30; 280/304.5; 280/288.4; 280/292; 280/492; 280/503; 280/240; 280/281.1
(58) Field of Classification Search ......... 280/204, 280/647, 30, 304.5, 288.4, 292, 492, 503, 280/240, 281.1
See application file for complete search history.

(56) References Cited

U.S. PATENT DOCUMENTS

| 5,308,096 | A | * | 5/1994 | Smith | 280/204 |
| 5,474,316 | A | | 12/1995 | Britton | |
| 6,554,307 | B1 | * | 4/2003 | Ockenden | 280/204 |
| 6,767,028 | B2 | | 7/2004 | Britton | |
| 2002/0074764 | A1 | * | 6/2002 | Allen et al. | 280/204 |

FOREIGN PATENT DOCUMENTS

CA  2208809  6/1998

OTHER PUBLICATIONS

2005 Product Guide, Chariot Carriers Inc., Sep. 2004.

* cited by examiner

*Primary Examiner*—Christopher P Ellis
*Assistant Examiner*—Cynthia F Collado
(74) *Attorney, Agent, or Firm*—Bennett Jones LLP

(57) ABSTRACT

A child transport vehicle comprising: a vehicle frame; displacement means depending from the frame; a vehicle attachment connector mounted on the vehicle frame and including a vehicle attachment connection site, the connector and the connection site may be configured to facilitate convertibility and usefulness of the vehicle.

16 Claims, 8 Drawing Sheets

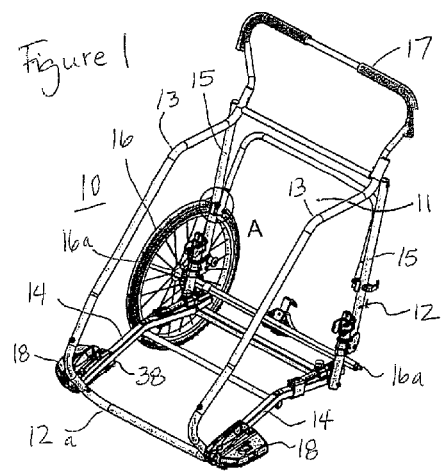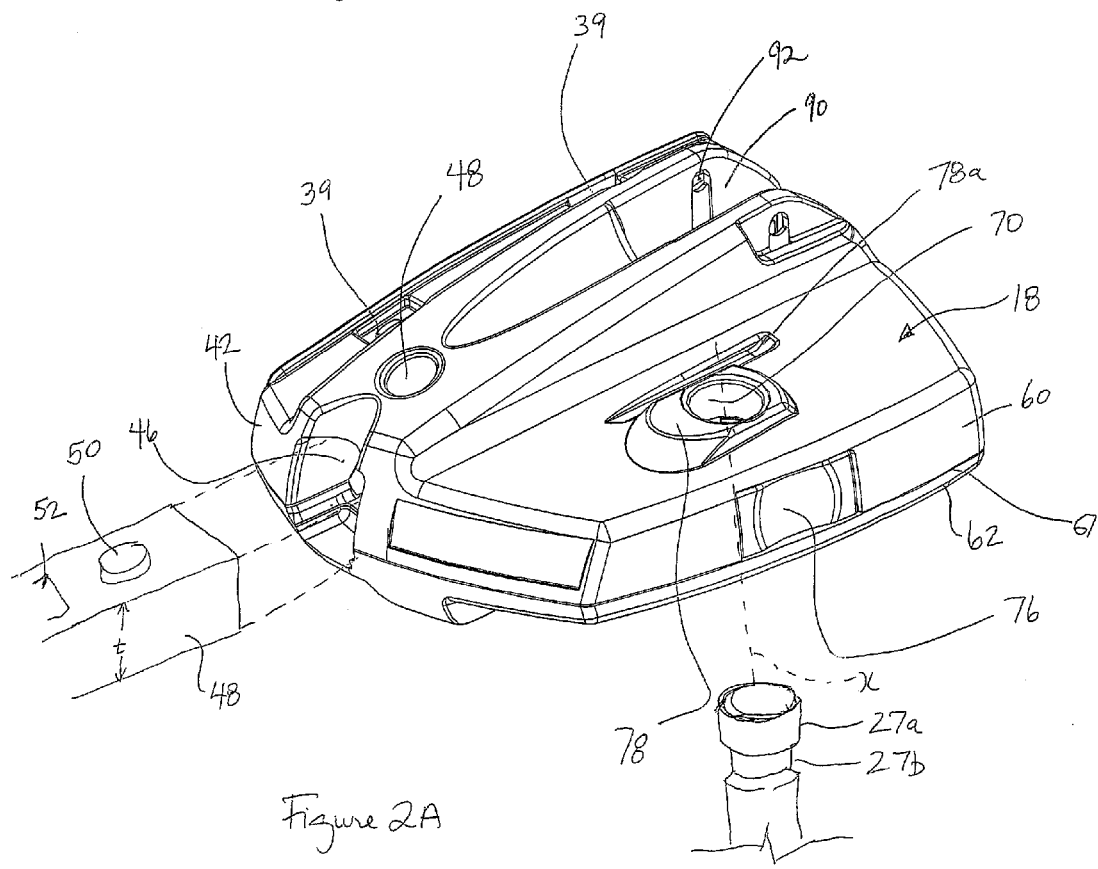

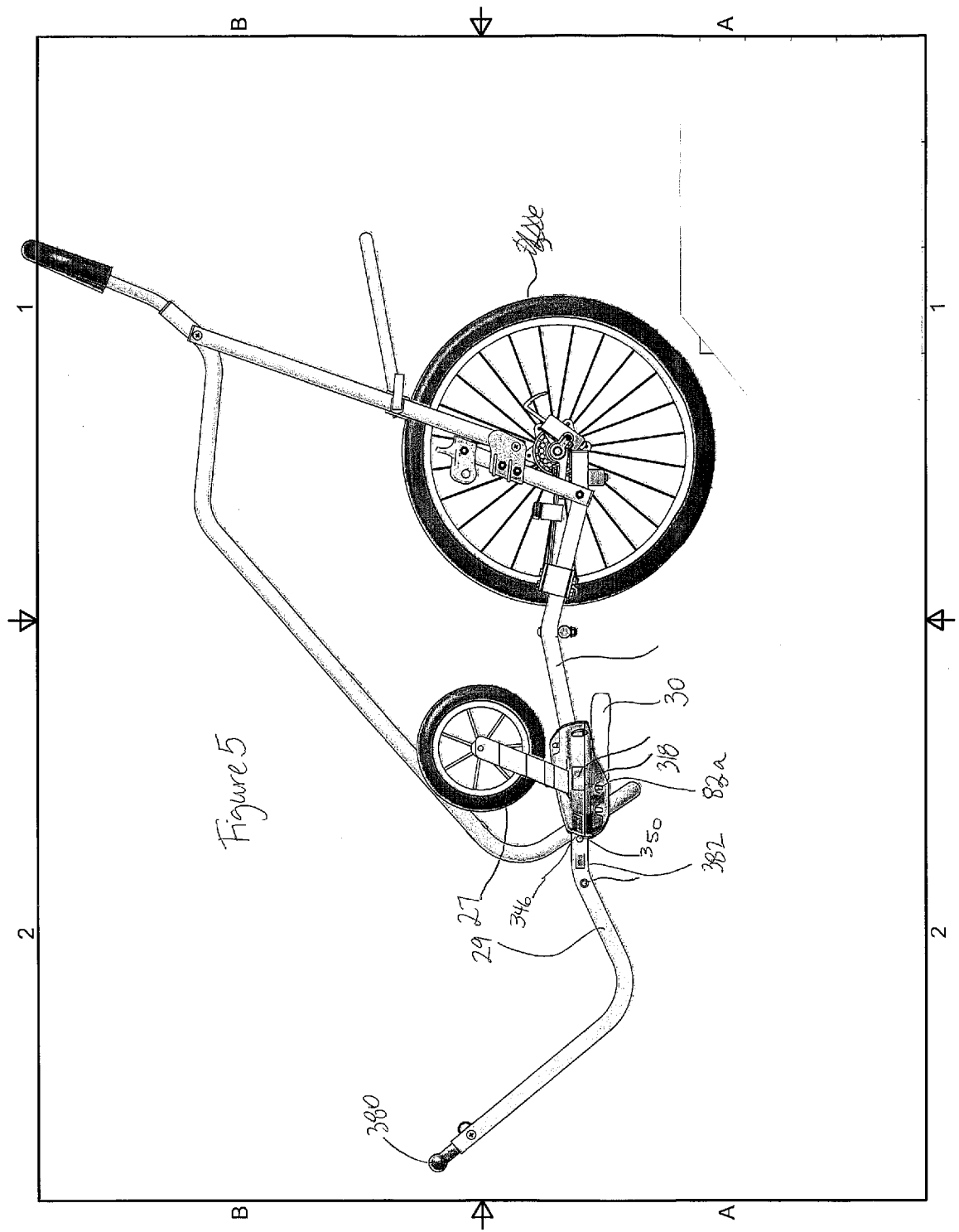

CHILD TRANSPORT VEHICLE

FIELD OF THE INVENTION

The present invention is directed toward child transport vehicles and in particular directed toward transport vehicles intended to be convertible between different transport modes.

BACKGROUND OF THE INVENTION

Child transport vehicles, such as strollers, trailers for towing as a wagon and/or by bicycles, hikers and skiers, are known in the art. Such child transport vehicles are useful for carrying small children as taught by U.S. Pat. No. 5,444,316 and U.S. Pat. No. 6,767,028.

To enhance the usefulness of these vehicles, some have been adapted for conversion between strollers and trailers by interchanging front stroller wheels and towing arms on a vehicle frame. Some child carriers have been provided with transport conversion connectors. For example, reference may be made to Canadian patent application 2,208,809, filed Jun. 26, 1997, which describes a child transport vehicle with a conversion connector. However, such conversion connector was very simple in form.

There has been a demand for a vehicle that is adaptable to address a number of child transportation needs without requiring complicated or time consuming operations. Further, in those vehicles that have the capability to convert, there is the additional problem of storing any transport attachments that may not be in use.

There has also been a demand for the ability to adapt a child transport vehicle to customize it for appearance or to be more suitable for the activities for which it is to be used.

SUMMARY

According to a broad aspect of the invention there is provided a child transport vehicle body comprising: a vehicle frame; displacement means depending from the frame; and at least one vehicle attachment connector for releasably securing a vehicle attachment, the vehicle attachment connector including a connection site and locking mechanism for accepting and releasably retaining the vehicle attachment, a first body part, a second body part secured to the first body part, and an open space formed between the first body part and the second body part, the open space formed to accommodate at least a portion of the connection site and locking mechanism.

According to another broad aspect of the invention there is provided a child transport vehicle comprising: a vehicle frame; displacement means depending from the frame; a towing arm; and a vehicle attachment connector including a towing arm connector slot having an open end, a first aperture for accepting a pinned connection between the towing arm to secure the towing arm in a first rotational orientation within and extending through the open end of the slot and a second aperture for accepting a pinned connection between the towing arm to secure the towing arm in a second rotational orientation within and extending through the open end of the slot.

According to another broad aspect of the invention there is provided a child transport vehicle comprising: a vehicle frame; displacement means depending from the frame; a stroller caster including a wheel and a mounting stem; and a vehicle attachment connector including an aperture to accommodate the mounting stem of the caster, a locking mechanism operable in the aperture to releasably secure the mounting stem of the caster in the aperture and a push button actuator on the vehicle attachment connector to drive operation of the locking mechanism.

According to another broad aspect of the invention there is provided a child transport vehicle comprising: a vehicle frame; displacement means depending from the frame; a left side vehicle attachment connector mounted adjacent a front left-side corner of the vehicle frame, a right side vehicle attachment connector mounted adjacent a front right-side corner of the vehicle frame, a U-shaped member connected at its first end to the left side vehicle attachment and connected at its opposite end to the right side vehicle attachment and positionable in a first position to extend out forwardly of a front end of the vehicle frame and in a second position to extend back rearwardly relative to the front end of the vehicle frame and under the vehicle frame.

It is to be understood that other aspects of the present invention will become readily apparent to those skilled in the art from the following detailed description, wherein various embodiments of the invention are shown and described by way of illustration. As will be realized, the invention is capable for other and different embodiments and its several details are capable of modification in various other respects, all without departing from the spirit and scope of the present invention. Accordingly the drawings and detailed description are to be regarded as illustrative in nature and not as restrictive.

BRIEF DESCRIPTION OF THE DRAWINGS

Referring to the drawings wherein like reference numerals indicate similar parts throughout the several views, several aspects of the present invention are illustrated by way of example, and not by way of limitation, in detail in the figures, wherein:

FIG. 1 is a perspective view of an embodiment of a vehicle main body according to the present invention;

FIG. 2A is a perspective view of a connector useful in the present invention with removable vehicle attachments aligned for installation thereto;

FIG. 5 is a side view of the vehicle of an embodiment of a child transport vehicle of the present invention with a wagon pull arm aligned for installation to convert the vehicle for operation in a towing trailer mode.

DESCRIPTION

Figure 2B:
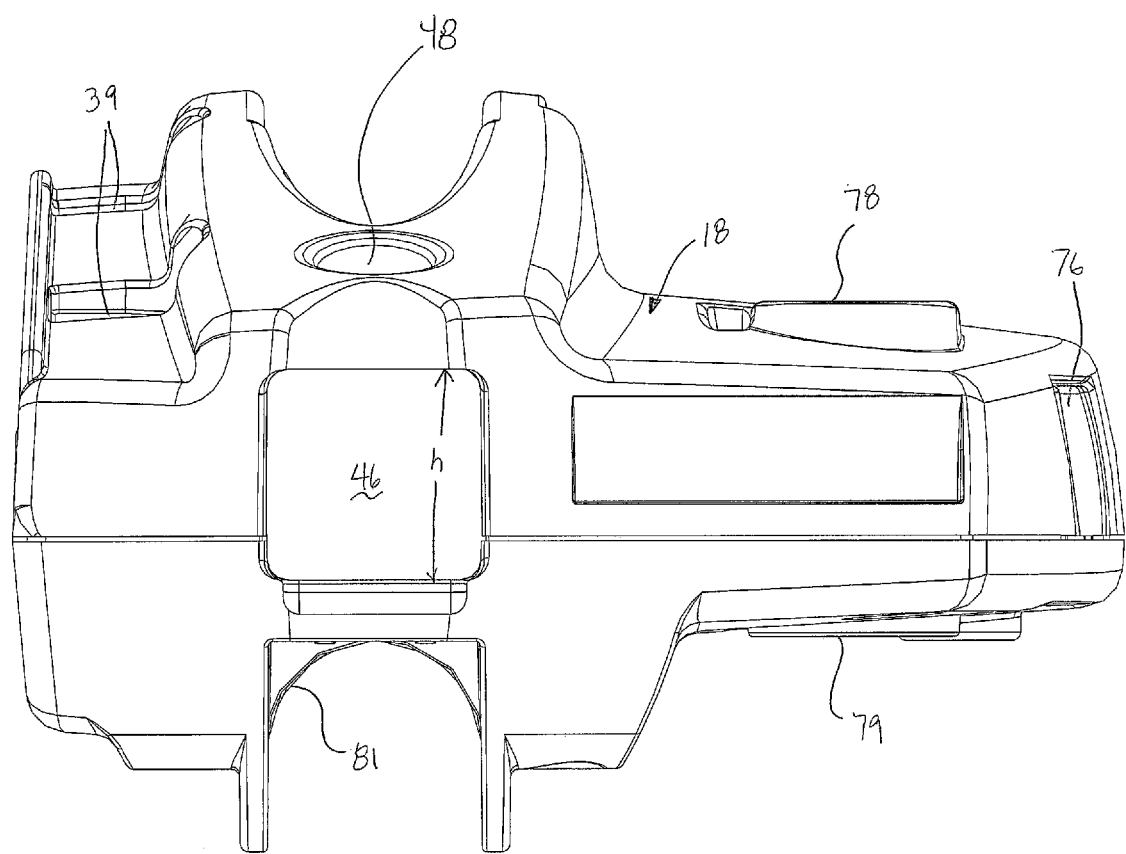
FIG. 2B is a front elevation of the connector of FIG. 2A.
Figure 2C:
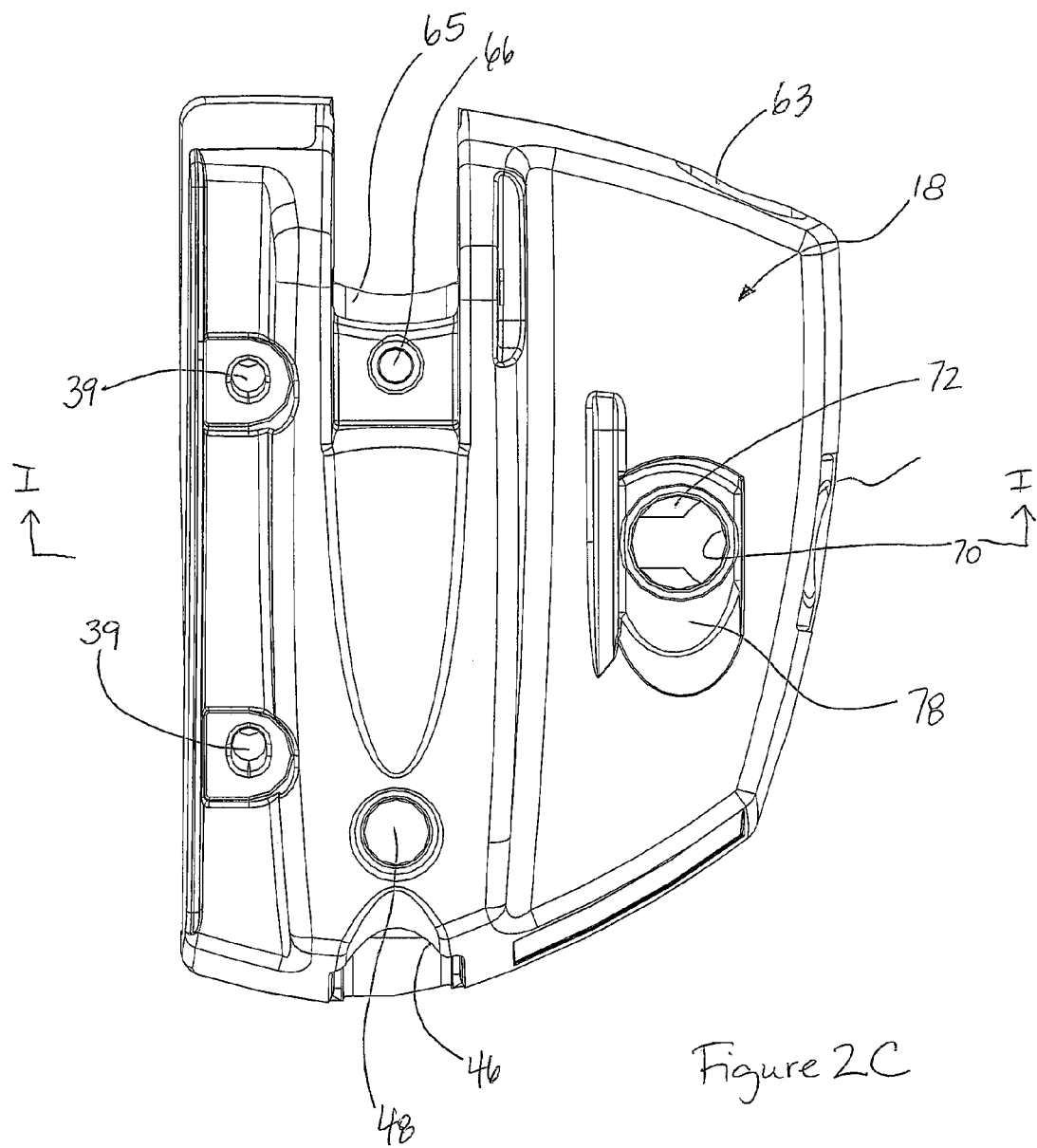
FIG. 2C is a top view of the connector of FIG. 2A.
Figure 2D:
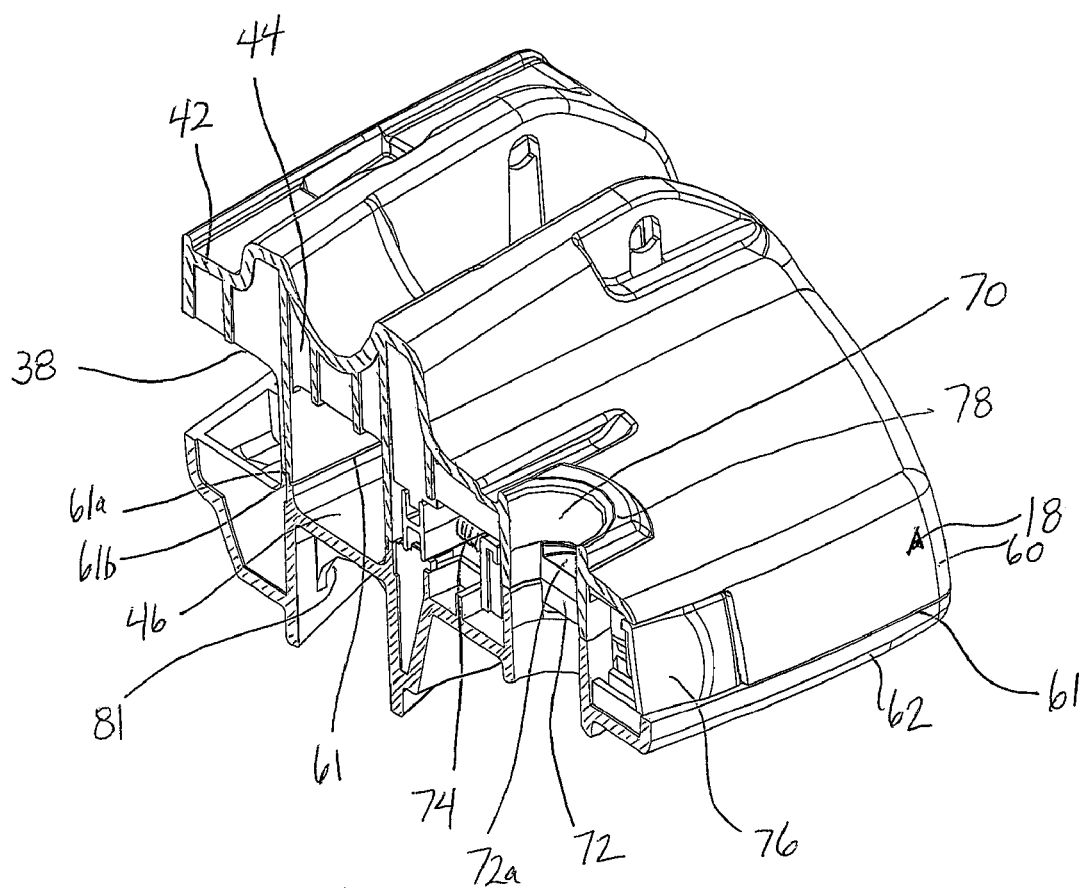
FIG. 2D is a sectional view along lines I-I of FIG. 2B.
Figure 2E:
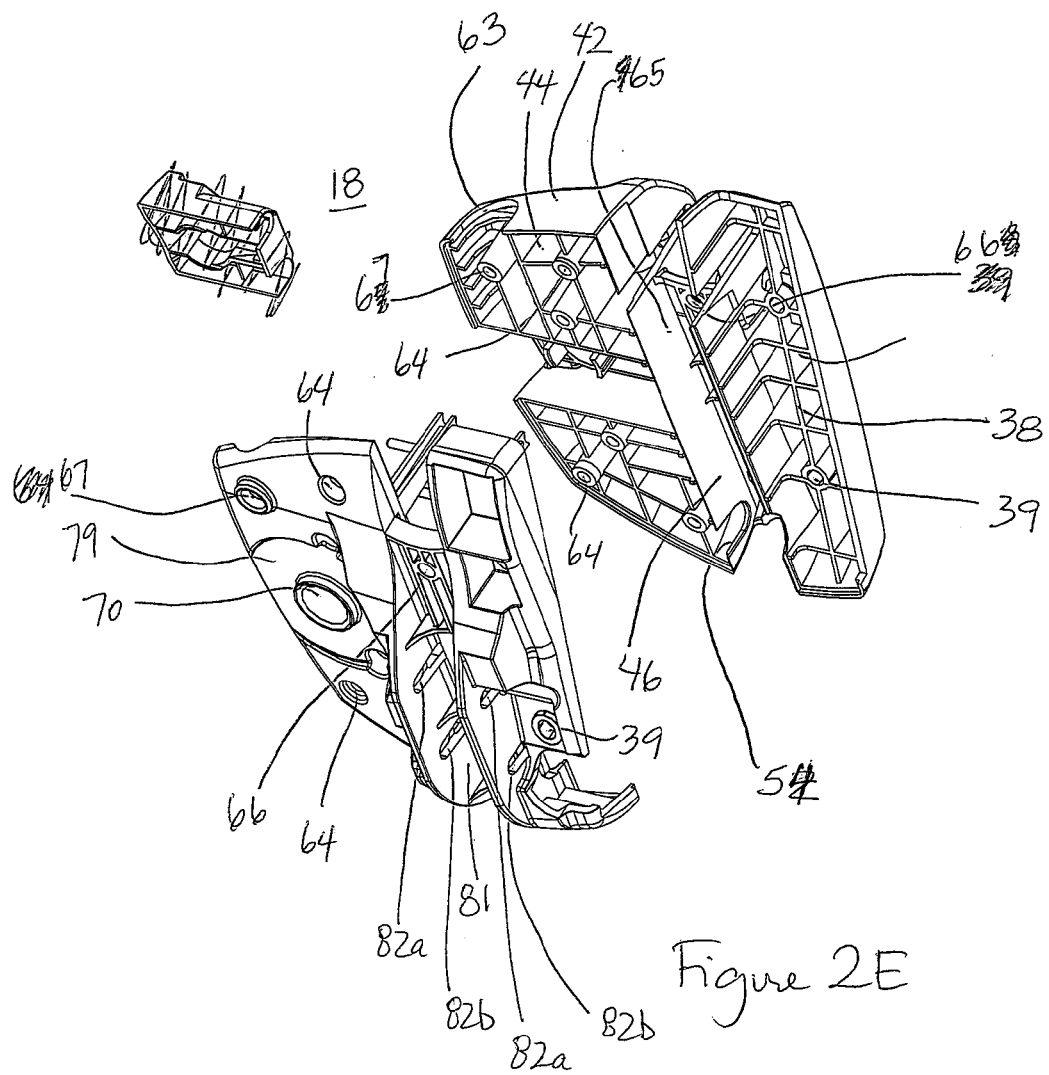
FIG. 2E is an exploded sectional view of the connector of FIG. 2A.

The detailed description set forth below in connection with the appended drawings is intended as a description of various embodiments of the present invention and is not intended to represent the only embodiments contemplated by the inventor. The detailed description includes specific details for the purpose of providing a comprehensive understanding of the present invention. However, it will be apparent to those skilled in the art that the present invention may be practiced without these specific details.

The vehicle of the present invention is formed to be useful for transporting children, pets or cargo. The vehicle may be convertible between several configurations through the use of different removable attachments. Further, the vehicle may be adapted to store at least some of the attachments when they are not in use. Both the conversion of the transport vehicle and the storage of vehicle attachments may be simplified by the use of an attachment connector on the vehicle. The attachment connector can accommodate a variety of removable attachments including, but not limited to any of a front wheel or a support arm therefor, a bicycle trailer hitch arm, a caster, a hiking or skiing harness arm, a wagon pull arm, a bumper, a fender and can also store an attachment when that attachment is not being used. As a result, such a connector provides that a single vehicle body can be fitted with any selected removable attachments and may alleviate the time and effort required and difficulties sometimes encountered in removing and storing an attachment not being used by allowing the attachment to remain on the vehicle body with a simple adjustment of the connector or of the attachment relative to the connector.

Referring to FIG. 1, one possible embodiment of a child transport vehicle main body 10 according to the present invention is shown. Vehicle body 10 has a frame 12. The frame of the vehicle body is sized and constructed to form a cargo area 11, which can accommodate a child. Although normally made of aluminum tubing, the frame can be formed of any suitable material such, as for example, rods, tubing, bars, sheets, etc, of polymers, metal, or wood. As will be appreciated, the frame may include or support various other features such as a seat, fabric covering, storage bins, etc. Vehicle frame 12 may be formed in various ways with various configurations of structural members. In the illustrated embodiment, vehicle frame 12 includes a plurality of structural members including upper members 13, lower members 14 and upright members 15. In the illustrated embodiment, the upright members are positioned at the rear of the vehicle opposite a front end 12a. A handle 17 may be provided in some embodiments to permit pushing of the vehicle.

Displacement means, such as a pair of wheels 16 may be pivotally mounted on frame 12, for example on axles 16a. Although only one wheel is shown in FIG. 1, other wheels have been removed to facilitate illustration. Other displacement means, such as skis or blades (not shown) can be used in place of or in addition to wheels 16. Oftentimes, displacement means are mounted to frame 12 in a removable fashion to permit conversion between transport modes and to reduce the size of the vehicle for storage.

A pair of connectors 18 for accepting and retaining removable vehicle attachments are provided on the frame. The connectors can be disposed in various locations such as on one or, as shown, on both sides of the vehicle body 10, on any of the frame members and anywhere along the length of the vehicle from the rear end to front end 12a. The connectors 18 permit removable vehicle attachments to be secured to the transport vehicle and may even permit the attachments to remain on the vehicle body 10 when the transport attachments are not being used. Removable vehicle attachments can be, but are not limited to conveyance attachments such as front wheels, casters 27 (shown in an operable position in FIG. 3 and in a stored position in FIG. 5), or conveyance connector arms such as one or more front wheel support arm or forks 28 (FIG. 4), a wagon pull arm 29 (FIG. 5), which can alternately be installed in another configuration to operate as a bicycle hitch arm. Another type of conveyance connector arm is a hiker/skier harness arm (not shown). Removable vehicle attachments can further include, but are not limited to a front acting U-shaped member forming a front bumper 30 (shown in an operable position in FIG. 4 and in a stored position in FIG. 5) and/or side bumpers 32 (FIG. 3), fenders (not shown), etc. For operation to secure such vehicle attachments connectors 18 may be positioned on both sides of the vehicle, adjacent the front end of the vehicle and lower on the vehicle, for example, mounted on or adjacent lower frame members 14. The connector may be provided external to any fabric covering of the vehicle so that it can be easily accessed by the operator and is shielded from easy access by the child occupant.

Referring to FIGS. 2A-2E, an embodiment of a connector 18 useful in the present invention is shown. The connector 18 can be formed of any suitable material such as metals or plastics by any suitable process such as molding or machining. In one embodiment, the connector can be formed integral with the frame. In another embodiment, the connector may be formed separately from the frame and attached thereto. In the latter instance, the connector may be coupled to the vehicle body by a number of means including but not limited to bolted hardware, screws, clamps, adhesives, rivets, or welding, etc. In the embodiment shown, connector 18 may be mounted on the vehicle for example through a mounting area 38 including for example a form to accept therein or thereagainst a portion of the vehicle frame and apertures 39 to accept fasteners such as screws, rivets, bolts, etc. to secure the connector to the frame.

The connector has various optional features of which any may be employed according to the invention alone or in combination. Of course, the connector can take forms other than those depicted. In the embodiment shown, the connector may include an outer shell 42 defining therein an inner area 44. The connector 18 can be formed with one or more removable vehicle attachment connector sites for accepting and reversibly securing a removable vehicle attachment. In one embodiment, connector 18 may includes a plurality of connection sites formed through the outer shell and extending into the inner opening. The connection sites can include any suitable means for accepting and securing a vehicle attachment, including but not limited to apertures, slots, mating extensions, or hinge arrangements. Such connection sites may include for example, slots, channels, apertures, etc. with or without lock assemblies to releasably secure the attachments in their respective slots, channels and apertures. Lock assemblies may take various forms such as pinned or latched connections with the pin or latch on either the attachment or in the connection site, grippers, frictional engagements, clamps, etc.

In the illustrated embodiment, the connector includes one connection site formed as a conveyance connector arm slot 46 positioned for accepting a conveyance connector arm 48 (FIG. 2A) which may extend forwardly of the vehicle such as, for example, any of a hitch arm, a wagon pull arm, a harness arm or a front wheel fork, one at a time. Since such connector arms 48 are intended to extend forwardly of the vehicle, the slot 46 may most conveniently be positioned to open at a front end of the connector. Also, since such arms are generally elongate, for example formed of tubing, rods or bars, slot 46 may be elongate extending from an opening though outer shell 42 and into inner area 44. Conveyance connector arm slot 46 may include a locking mechanism, such as for example, an aperture 48 opening thereto to accept a pin 50 forming releasable pinned connection to any conveyance connection arm positioned in the slot. Pin 50 may be formed for engagement in the aperture to complete the pinned connection and may be, for example, a removable pin formed separately from either the connector or the arm, a fixed pin on the arm or a spring biased detent pin, as desired. In the illustrated embodiment, pin 50 is a spring biased detent pin depressible by button actuator 52. In one embodiment, conveyance connector arm slot 46 may include a second releasable locking mechanism to permit locking installation of a conveyance connector arm in slot 46 apart from use of aperture 48. For example, a second aperture 54 (shown in FIG. 2E as an enlarged area opening from slot 46 that does not extend fully through the outer shell of connector 18) may be provided in the slot to accept a pin, which may be a differently positioned pin or a pin that could also fit in the aperture 48 if the arm was oriented to insert the pin in that aperture. This may be useful for various reasons, one of which for example, is to expand the usefulness of any particular vehicle attachment. For example, with reference to FIG. 5 arm 29 may be installed with its pin 350 aligned to lock into an aperture in a side of slot 46 (for example in a location corresponding to that of second aperture 54) when it is desired to use the arm as a wagon pull, as illustrated. However, arm 29 may be used as a bicycle hitch arm by reorientation of the arm and insertion into the slot so that pin 350 is aligned to engage in aperture (cannot be seen in FIG. 5).

In one embodiment, the connector may include a removable body portion including a portion of outer shell 42 that provides access into slot 46 and can be adjustably mounted to the remaining of the body of connector 18 so that the tolerances, for example the height h of the slot, created between the removable body portion and the remainder of the connector, may be adjusted. This permits flexibility in the sizes, for example thicknesses t, of arms that can be installed into slot 46. In one embodiment, for example, connector 18 can be formed of a first part 60 and a second part 62 and slot 46 may be formed therebetween, with a portion of the slot being defined by a surface of first part 60 and another portion of the slot being defined by a surface on second part 62. Fasteners may be used to secure through apertures 64, the parts together and to adjust the proximity of parts 60, 62 to thereby control the height h of slot 46. First part 60 and second part 62 may be variously configured relative to each other. For example, the parts may be an upper part and a lower part of the connector.

The break 61 between parts may be selected to pass through other connection sites, if desired, to also permit access to and/or adjustment of those sites by separation of the parts. The illustrated embodiment includes, for example, a first rear installation slot 63 formed between parts of the connector, a second rear installation slot 65 formed between the parts, which in the illustrated embodiment is an extension and rear opening of slot 46. Rear slot 65 may also be used to verify the installation of an attachment into slot 46. These rear slots may, alternately or in addition, be used to connect removable attachments such as side bumpers 32 (FIG. 3), fenders (not shown), bars on which panniers or bags can be carried, and/or to store unused conveyance connector arms or other unused removable attachments out of their normal operational position. The rear slots show two options for locking mechanisms. First rear installation slot 63 includes a pin 67 formed therein for securing through an attachment inserted therein. In one embodiment, the pin is fixed and includes a fastener threadable therein. To install an attachment, the fastener may be removed to allow insertion about the pin and the fastener may be reinstalled to secure the parts together. Second rear installation slot 65 includes a pair of aligned apertures 66 for securing therein a pin to be secured through any part inserted into the slot.

If desired, outer shell 42 may extend substantially about the entire outer surface of connector 18 to provide a substantially smooth surface thereabout. If the connector is formed in parts, such as first part 60 and second part 62, the parts may be configured such that their edges 61a, 61b come together to continue the outer surface curvature, such that the edges of the parts are protected against each other. In another embodiment, the perimeter shape, in plan, of the first part, for example, an upper part and the second part, for example the lower part, may be selected to substantially conform and so that the edges come together when the parts are assembled. Such a connector may assume the form of a single part with an apparent continuous curvature without sharp exposed edges, as will be appreciated may be formed at a sharp edge of a molded part. This construction may reduce the amount of post mold treatment (i.e. edge treatment) that must be performed. Some edges such as edges 61a, 61b may be formed to create a joint, such as a butt joint, or one edge 61a may have an extension that fits behind and overlaps the other edge 61b or an extension thereon, such that some engagement and alignment of the parts through the interface is achieved, and passage therethrough of debris is avoided, through interaction of the edges.

Figure 3:
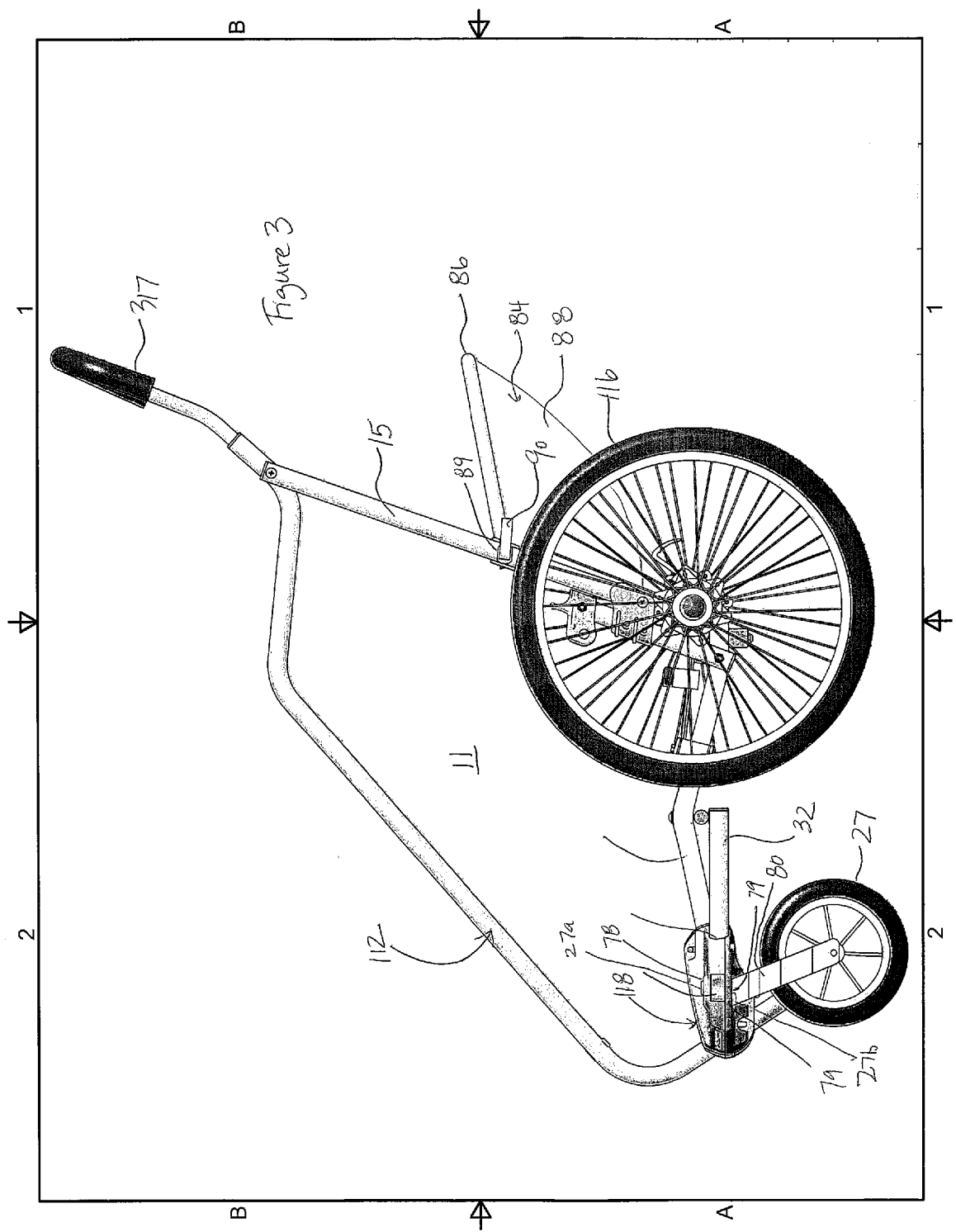
FIG. 3 is a side view of an embodiment of a child transport vehicle of the present invention in the four-wheeled stroller mode.

Another connection site that may be provided on connector 18 is an aperture 70 for connection of a castor 27, shown in an operable position in FIG. 3, to render the vehicle operable for use as a four-wheel stroller. In the embodiment shown, aperture 70 is adapted to accommodate and secure the stem 27a of a caster such that the caster may operate and pivot below connector 18. As will be appreciated, the aperture construction should correspond to the stem of the caster so that it can be engaged in the aperture. Aperture 70 may also be formed to engage castor stem inserted from an upper surface of the connector such that castor 27 can be engaged in a stored position extending above the connector, as shown in FIG. 5.

Aperture 70 may include a locking mechanism to releasably secure any castor stem 27a inserted into therein. In one embodiment, the locking mechanism may be operable to engage the castor stem similarly regardless of whether it is inserted from the top or the bottom of the aperture. The locking mechanism may operate in various ways, as by pinned connections, keyed mechanisms, latches, etc. In the illustrated embodiment for example, the locking mechanism includes a spring-biased gate 72 configured and biased to normally extend into aperture 70, but which can be urged, as by application of pressure against the force of spring 74, out of the aperture to permit passage of the castor stem. Castor stem 27a may include a gland 27b positioned to accept and retain gate 72, when the gland passes adjacent the gate. Gate 72 may include chamfered upper and lower surfaces 72a that tend to urge the gate out of the aperture when a structure such as stem 27a is inserted along axis x through aperture 70. The illustrated locking assembly may further include an actuation button 76 that may be actuated to urge gate 72 out of the aperture, for example, when it is desired to remove castor 27 from the aperture. The upper and lower connector surfaces 78, 79 about aperture 70 may be formed to substantially follow the surface configuration of the castor adjacent the stem such that the connector provides support for the castor surface that will bear thereagainst. For example, in the illustrated embodiment of FIG. 3, the castor clevis 80 is formed planar about the stem 27a and surfaces 78, 79 are also formed substantially planar, for example about axis x, to follow the planar surface at the upper end of clevis 80. In one embodiment, the connector 18 and castor 27 may be selected to interengage when the castor is inserted from the top such that the castor cannot rotate in aperture 70 when in the stored position. In such an embodiment, as illustrated, a notch 78a is provided on the upper surface of connector 18 into which a protrusion 27b on the castor, for example on stem 27a or clevis 80, may be engaged.

Connector 18 may, alternately or in addition, provide for connection of a front bumper 30. Front bumper 30 may be connected to and extend between connectors 18 on each side of the vehicle. Although the ends of the bumper may be connected to the connectors in various ways, as for example through insertion into a front facing slot, in the illustrated embodiment, an elongate indentation 81 is formed on the underside of each connector into which the ends of the bumper are installed. The bumper may be installed in various ways permanently or removably between connectors. In the illustrated embodiment, each indentation includes apertures 82a, 82b on either side thereof to accept pins 83a, 83b. One set of pins 83a may act as pivot pins, allowing the bumper to move from an extended position (FIG. 4), extending forwardly of vehicle body front end 12a to a position folded back beneath the vehicle. Other pins 83b may act as lock pins to secure the bumper in a selected position. Pins 83a, 83b may be provided to engage through apertures in each end of bumper 30 and through corresponding apertures 82a, 82b. Of course, other mounting and locking mechanisms can be used as desired, such as Velcro straps, frictional resistance, clips, etc.

As shown in FIG. 3, a child transport vehicle is shown according to the present invention. The vehicle has a main body including frame 112 and a pair of wheels 116 that depend from frame 112. (Only one wheel 116 can be seen, as the other is on the opposite side of the vehicle). A transport attachment connector 118 is provided on the vehicle and secured to frame 112. (Only one connector 118 can be seen in the Figure as the other is on the opposite side of the vehicle.) In the embodiment depicted, the vehicle is in a four-wheel stroller mode with a caster 27 secured in an operational position in each connector 118. Although this is not illustrated clearly, casters 27 are secured through apertures 170 formed in the connector. A stroller handle 317 is secured on the vehicle. Only one caster 27 can be seen in the Figure as the other caster is on the opposite side of the vehicle.

Connector 118 further includes a side bumper 32 inserted in a rear facing slot 63. The side bumper extends out laterally from the vehicle to divert obstacles from the side of the vehicle, for example, from catching in wheels 116. The side bumper may also support such items as bags, fenders, etc.

Figure 4:
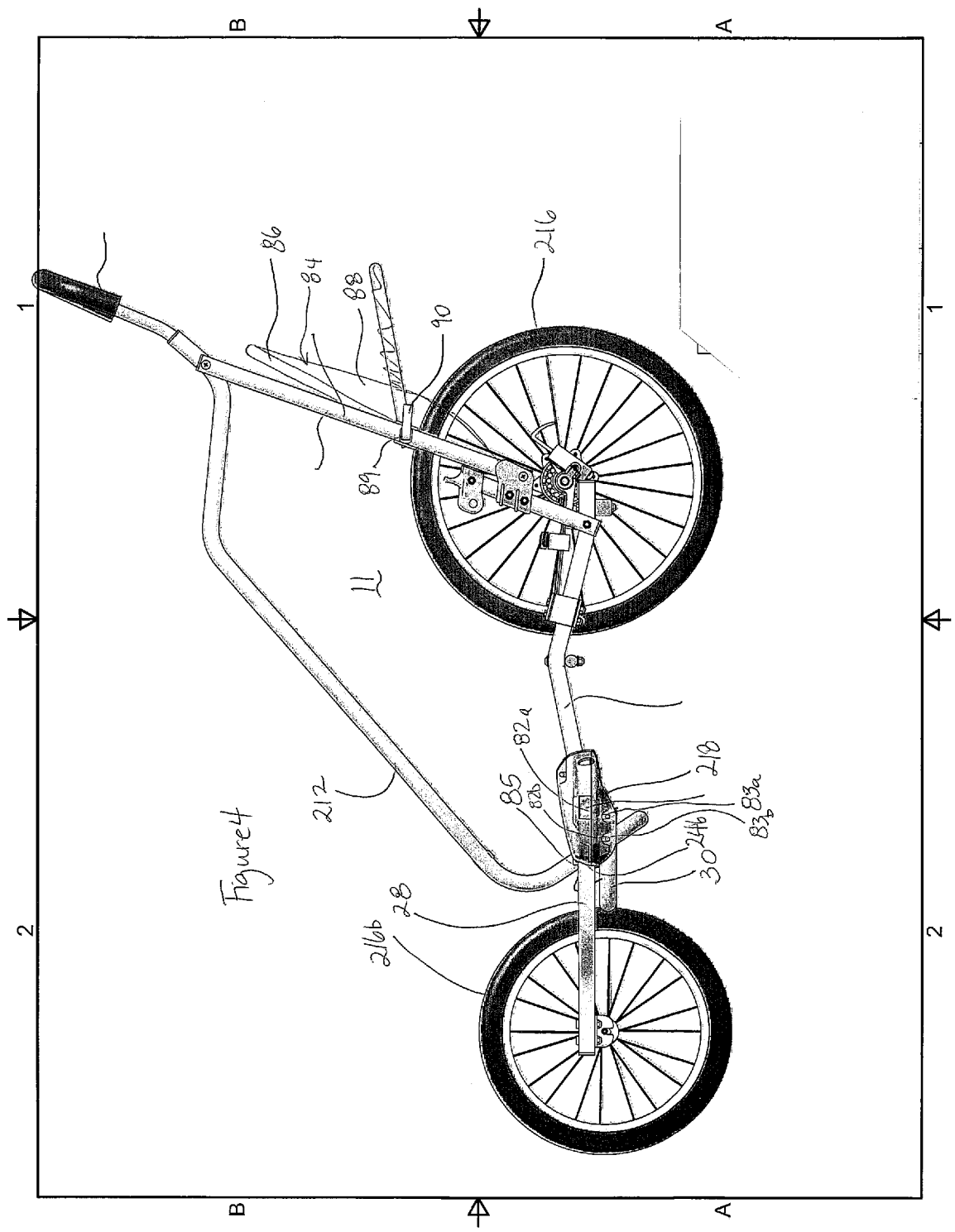
FIG. 4 is a side view of an embodiment of a child transport vehicle of the present invention in the three-wheeled stroller mode.

Referring to FIG. 4, another vehicle according to the present invention is shown in a three-wheel stroller mode useable, for example, at speeds associated with jogging. The vehicle has a pair of rear wheels 216, the closest of which has been removed to facilitate illustration therebehind. The vehicle further includes at least one connector 218 positioned at a front corner of the vehicle frame 212. (Only one connector 218 can be seen in the Figure as the other is on the opposite side of the vehicle.) The front stroller wheel assembly includes arm 28, which supports front wheel 216b. Arm 28 is secured in a front-facing slot 246 of the connector. Connector 218 further has installed thereon a front bumper 30 in an operational position secured to extend out forwardly of frame 212. Front bumper 30 may support a splash guard, fender, single front stroller wheel and/or a brake assembly for front wheel 216b, if desired. The brake assembly may be positioned on bumper to align behind wheel 216b, when the bumper is in the operative position.

Referring to FIG. 5, a vehicle is shown in a wagon mode having an arm 29 installed in a front-facing slot 346 of an attachment connector 318 on the vehicle. Arm 29 is installed in a configuration to act as a wagon pull arm. Arm 29 may have a various forms, such as for example an elongate member with a handle on one end. In the illustrated embodiment, arm 29 is similar to those used in bicycle trailers having a hitch ball 380 and an elongate portion 382. Elongate portion 382 has an end including a pin 350 securable in the slot of the connector 318. The slot includes a locking mechanism to also accept arm 29 in a configuration for use as a bicycle trailer hitch. FIG. 5 also depicts the positioning of a caster 27 in the storage position ready for use by repositioning should conversion of the vehicle to a stroller, be desired. Connector 318 further supports a front bumper 30 in a stored position to extending back from the front end of frame 312 extending back under the vehicle.

As can be appreciated, the connector of the present invention may accommodate different transport attachments such as those disclosed in Canadian Patent Application No. 2,208,809. For example, the transport attachment may be a hiking hitch frame or a support arm in the form of a caster support bar.

The body of the vehicle, including the frame and fabric covering, is commonly the most expensive part of a child transport vehicle. The present invention permits the vehicle body to be used for many forms of child transport by simply exchanging the attachments. Furthermore, the connector of the present invention allows an attachment to remain secured on the transport vehicle even when that particular attachment is not being used. For example, the casters can be maintained in the connectors in the inactive or not in-use position at the same time as a hitch arm or front wheel attachment is in use.

The connector also allows attachments to be interchanged easily to convert the vehicle between a three-wheel or four-wheel stroller, or a towable trailer without the aid of specific tools.

As a result, the present invention may alleviate the time and effort involved in having to remove an unused attachment and locating a place to store it until it is required again and conversely, the time and effort in locating and installing or removing a particular attachment when it is or is no longer required.

In one embodiment, the connectors may serve other purposes. For example, the connectors may be positioned, formed or configured to act as bumpers or to act as fenders, to deflect materials away from the wheels. Also the connectors may be used to form or support other fixtures such as connection points for frame expansion or installation of other removable vehicle attachments. In one embodiment, for example, connectors 18 may have formed thereon or connected thereto anchors such as loops, hooks 85, etc. on which vehicle coverings may be secured. Any such hook 85 may include a projecting part extending away from the position of the covering such that a portion such as a loop, edge, pocket, etc. on the covering may be hooked thereabout. In another embodiment, connectors 18 may be formed to support or engage a component to be stored. As described, hereinbefore, the connectors may be used to support a castor in a storage position or an unused arm in a rear slot. As another option, connector may be formed to include a storage area 90 including apertures 92 for accepting a pinned connection to an arm, such as an arm 29. Storage area 90 may be formed open on an upper surface of the connector, for example, as a channel between apertures 92. Such an open configuration permits an arm to be set into the storage area in a relatively simple manner and more careful alignment operations, such as would be required to insert an arm in a rear slot, aren't required.

To enhance convertibility, between various transport modes, it may sometimes be necessary to adjust other components on the vehicle. For example, the gait of a user may be shorter when using the vehicle in a four-wheeled stroller mode (FIG. 3) than when the vehicle is used in a jogging stroller mode (FIG. 4). As such, a storage bin 84 that is suitably positioned at the rear of the stroller may be suitably positioned during stroller operation, but may be in the way during jogging operation. In one embodiment, for example, storage bin 84 may be made foldable to be open in one position (FIG. 3) and to be folded against the frame in another position (FIG. 4) when desired to allow more room at a rear of the vehicle, under the handle. Storage bin 84 may include an upper edge support rod 86 supporting the upper edge of a collapsible panel 88, which may be for example of flexible sheet materials, for example similar to the fabric covering of the vehicle, that extends down and is secured against the vehicle to form a pocket. Upper edge support rod 86 may be connected by pivotal connections 89 at the rear of the vehicle such that the rod can be moved between a position extending out from the rear of the vehicle, wherein bin has an open upper end, to a position in which the rod is pivoted up against the rear of the vehicle, wherein the panel 88 is drawn against the rear of the vehicle. A lock may be provided to releasably retain the rod at least in the upper position. The lock assembly may include various mechanisms, such as straps, etc. In the illustrated embodiment, an over centering knob 90 may be used at each pivotal connection 89. Upper edge support rod 86 may extend in a U-shaped form from side to side or may be a plurality of rods, including one mounted on each side of the bin.

The previous description of the disclosed embodiments is provided to enable any person skilled in the art to make or use the present invention. Various modifications to those embodiments will be readily apparent to those skilled in the art, and the generic principles defined herein may be applied to other embodiments without departing from the spirit or scope of the invention. Thus, the present invention is not intended to be limited to the embodiments shown herein, but is to be accorded the full scope consistent with the claims, wherein reference to an element in the singular, such as by use of the article "a" or "an" is not intended to mean "one and only one" unless specifically so stated, but rather "one or more". All structural and functional equivalents to the elements of the various embodiments described throughout the disclosure that are know or later come to be known to those of ordinary skill in the art are intended to be encompassed by the elements of the claims. Moreover, nothing disclosed herein is intended to be dedicated to the public regardless of whether such disclosure is explicitly recited in the claims. No claim element is to be construed under the provisions of 35 USC 112, sixth paragraph, unless the element is expressly recited using the phrase "means for" or "step for".

We claim:

1. A child transport vehicle body comprising: a vehicle frame; displacement means depending from the frame; and at least one vehicle attachment connector for releasably securing a vehicle attachment, the vehicle attachment connector including a first body part, a second body part formed separately from and secured to the first body part, and a slot defined between the first body part and the second body part and extending into the vehicle attachment connector, the slot formed to accept therein a portion of the vehicle attachment, the slot formed by a first surface of the first body part and a second surface of the second body part, the first surface and the second surface defining therebetween an interior dimension of the slot and the first body part and the second body part being secured together with an adjustable proximity therebetween to provide an adjustable spacing between the first surface and the second surface such that the interior dimension can be changed and selected.

2. The child transport vehicle body of claim 1 wherein the first surface of the first body part defines an upper portion of the slot and the second surface of the second body part defines a lower portion of the slot and wherein the interior dimension selected by the adjustable proximity is a height of the slot.

3. The child transport vehicle body of claim 1 further comprising a locking mechanism for the slot to secure the vehicle attachment in the slot.

4. The child transport vehicle body of claim 1 further comprising an aperture extending into the connector for accommodating a castor and a moveable locking mechanism moveable into and out of the aperture, and the moveable locking mechanism is positioned in with the first body part and the second body part extending substantially thereabout.

5. The child transport vehicle body of claim 1 wherein the first body part includes edges and the second body part includes edges and at least some of the edges of the first body part and at least some of the edges of the second body part are interengaging.

6. The child transport vehicle body of claim 1 wherein the first body part includes edges and the second body part includes edges and at least some of the edges of the first body part and at least some of the edges of the second body part are overlapping to deter passage of debris into the open space.

7. The child transport vehicle body of claim 1 wherein the vehicle attachment is a towing arm and the slot includes an open end, a first aperture opening into the slot for accepting a pinned connection with the towing arm to secure the towing arm in a first rotational orientation within and extending through the open end of the slot and a second aperture for accepting a pinned connection with the towing arm to secure the towing arm in a second rotational orientation within and extending through the open end of the slot.

8. A child transport vehicle comprising: a vehicle frame; displacement means depending from the frame; a stroller caster including a wheel and a mounting stem, the mounting stem including a gland thereon; and a vehicle attachment connector including an aperture to accommodate therein the mounting stem of the caster, a locking protrusion operable to protrude in the aperture such that the locking protrusion can engage in the gland of the mounting stem to releasably secure the mounting stem of any caster inserted into the aperture; a spring biasing mechanism that normally biases the locking protrusion in a position protruding into the aperture and a push button actuator on the vehicle attachment connector including an exposed button surface on an outer surface of the vehicle attachment connector, the exposed button surface being depressable to drive the locking protrusion against the spring biasing mechanism and out of the aperture in a direction away from the exposed button surface.

9. The child transport vehicle body of claim 1 wherein the adjustable proximity is provided by a fastener securing the second body part to the first body part, the fastener being adjustable to select the proximity of the second body part to the first body part at the slot.

10. The child transport vehicle of claim 8 wherein the aperture opens to an underside of the vehicle attachment connector offering an operable position for the caster.

11. The child transport vehicle of claim 10 wherein the aperture further opens to an upper side of the vehicle attachment connector offering a storage position for the caster, wherein the stem is inserted into the aperture from the top side of the vehicle attachment connector.

12. The child transport vehicle of claim 11 further comprising a shoulder on the upper side of the vehicle attachment connector adjacent the aperture against which an exposed portion of the stem can abut to prevent rotation of the stem in the aperture.

13. The child transport vehicle of claim 10 wherein the aperture opens on a surface of the vehicle attachment connector such that the caster can be inserted therein to be in a storage position.

14. The child transport vehicle of claim 8 wherein the locking protrusion includes a chamfered lower surface formed to permit the stem to bear against the locking protrusion and drive the locking protrusion against the spring biasing mechanism.

15. The child transport vehicle of claim 8 wherein the locking protrusion extends out into the aperture from within the vehicle attachment connector and the spring biasing mechanism is contained within the vehicle attachment connector.

16. The child transport vehicle of claim 8 wherein the vehicle attachment connector is mounted on a front right hand side of the vehicle frame and the vehicle further comprises a second vehicle attachment connector mounted on the front left hand side of the vehicle frame.

* * * * *